United States Patent [19]

Cox et al.

[11] 3,883,145

[45] May 13, 1975

[54] GOLF BALL AND COMPOSITION FOR FORMING THE SAME

[75] Inventors: Alvon R. Cox; William W. Latou, both of Ashland, Ohio

[73] Assignee: The Faultless Rubber Company, Ashland, Ohio

[22] Filed: Oct. 9, 1967

[21] Appl. No.: 673,931

Related U.S. Application Data

[63] Continuation-in-part of Ser. No. 565,416, July 15, 1966, abandoned.

[52] U.S. Cl. ............... 273/218; 260/4; 260/42.32; 260/42.37; 260/897; 260/998.14
[51] Int. Cl. ...... A63b 37/00; C08d 3/08; C08d 9/10
[58] Field of Search ....... 273/218; 260/41.5, 4, 889, 260/42.32, 42.37, 998.14

[56] References Cited
UNITED STATES PATENTS 3,313,545  4/1967  Bartsch .............................. 273/218
3,421,766  1/1969  Chmiel et al. ...................... 273/218
3,478,132  11/1969  Randolph .......................... 260/41.5

FOREIGN PATENTS OR APPLICATIONS 611,301  12/1960  Canada .................................. 260/4

*Primary Examiner*—Allen Lieberman

[57] ABSTRACT

This invention relates to a composition for forming a unitary molded golf ball and which composition comprises essentially highly resilient polybutadiene rubber, a cross linking agent, such as trimethylol propane trimethacrylate, a curative agent, non-black reenforcement and/or filler material, and a high density olefin, specifically an ultra high molecular weight linear polyethylene, which composition can be molded to form a golf ball having highly desirable properties.

22 Claims, No Drawings

GOLF BALL AND COMPOSITION FOR FORMING THE SAME

This application is a continuation-in-part of our prior application Ser. No. 565,416, filed July 15, 1966 now abandoned.

The present invention relates to golf balls, and to new and improved compositions for forming a golf ball, which ball is made from a unitary elastomer body having a substantially uniform composition throughout.

At the present time, all high quality balls are made from several different components which usually include a center, some type of a rubber or elastomer strip or tape that is wound around the center and completely encloses the center, and a cover that is molded as an integral unit around the wrapped center of the ball. Some efforts have been made heretofore to provide a unitary homogeneous type of a golf ball, as exemplified by U.S. Pat. Nos. 3,238,156 and 3,239,228.

In all events, high quality golf balls as in use today are at least primarily made by costly forming operations required to make the centers, windings, and covers and to assemble such components. These balls have specified limits as to their size, weight and initial impact velocity, which limits must be strictly complied with if the ball is to have approval of the governing bodies in golf play, such as United States Golf Association. Furthermore, good golfers recognize quality balls in most instances by the very pleasant sounding "click" that is obtained when a golf ball is properly struck by a club, such as a driver, and for acceptance of a new ball, it must have a sound comparable to that of relatively expensive high quality balls of previously known construction.

Therefore, it is the general object of the present invention to provide a new and improved high quality, unitary golf ball of a substantially uniform composition throughout, which golf ball is primarily made from a butadiene base rubber elastomer having a cross linking agent and an ultra high molecular weight linear polyethylene mixed therewith.

A further object of the invention is to provide a new and improved composition for use in making integral or unitary types of golf balls therefrom and where the composition includes a highly resilient polybutadiene elastomer having at least 30 percent cis configuration, a methacrylate monomer, a linear polyethylene, and a peroxide curing agent therein.

A further object of the invention is to provide a unitary substantially homogeneous composition golf ball that is made from a polybutadiene rubber elastomer and which has good compression characteristics, a relatively high durometer, a high rebound characteristic, a satisfactory initial impact resistance and/or strength in relation to other unitarily molded and shaped golf balls.

A further object of the invention is to improve the strength and durability of a unitarily molded golf ball whereby it is of improved resistance to shattering even after repeated impacts or use of the ball in play.

A further object of the invention is to provide a new and improved golf ball of a unitary construction throughout and which golf ball has high resistance to cutting or marring of the periphery of the golf ball, and which ball has high quality characteristics of play when in use.

The foregoing and other objects or advantages of the invention will be made more apparent as the specification proceeds.

The present invention, in one embodiment thereof, relates to the provision of a golf ball made from a unitary, solid, elastomer made by vulcanization of the following ingredients in substantially the ratios stated: a highly resilient polybutadiene rubber, having about 30 percent cis configuration, about 80 to 100 parts, natural rubber between about 0 to 20 parts, styrene resin from about 0 to about 12 parts, a cross linking agent from between 25 to 50 parts, a non-black filler material and/or reenforcing materials between about 30 to 60 parts, a high density ultra high molecular weight olefin between 2 and about 40 parts, a peroxide curative agent from between about 0.5 to 10 parts and usually including minor amounts, such as up to about 10 parts, of other compounding ingredients such as accelerators, anti-oxidants, coloring pigments, whiteners, etc.

One specific composition of the invention for use in forming unitary golf balls therefrom is as follows:

| Based on 100 parts of elastomer | Preferred Example | Range of Composition |
| --- | --- | --- |
| Highly Resilient Polybutadiene Rubber | 90 parts | 80 – 100 parts |
| Natural Rubber (when used) | 10 parts | 5 to 15 or 20 parts |
| Cross Linking Agent (trimethylol propane trimethacrylate) | 39 parts | 25 – 50 parts |
| Curative (peroxides) | 3 parts (40% active) | .5 – 10 parts |
| Non-Black Reenforcement and Filler | 40 parts | 30 –60 parts |
| High Density Olefin (Ultra-High Molecular Weight Linear Polyethylene) | 25 parts | 2 – 40 parts |
| Anti-Oxidants, Accelerators | 1 part | 0 – 5 parts |
| Styrene Resin (when used) | — | 2 – 12 parts |

Hence, it is seen that the golf ball composition of the invention consists essentially of, for example:

highly resilient polybutadiene rubber, 90 parts, natural rubber, when used, 10 parts, ester type resin 39 parts, curative peroxide 3 parts, reenforcing and filler material 40 parts, and high molecular weight linear polyethylene 25 parts.

It should also be noted that the composition may include small amounts of other curing agents, anti-oxidants, and/or coloring pigments. Some hardening and/or processing aid materials may also be present in some instances while natural rubber may be eliminated in some formulas and good quality balls can still be obtained. It will be understood that the elastomer used may be all one material or blends of two or more materials may be used.

The following compositions have all been formulated and tested in making golf balls and all of these formulas have provided golf balls having extremely desirable characteristics. These formulas are:

| Compounds | A | B | C | D | E |
|---|---|---|---|---|---|
| Low cis content Polybutadiene | 53.16 | 62.03 | 16.00 | 50.00 | — |
| High cis content Polybutadiene | 37.98 | 37.97 | 70.00 | 50.00 | 87.50 |
| 1-X Crepe | 8.86 | — | 10.67 | — | 10.00 |
| Styrene Resin | — | — | 3.33 | — | 2.50 |
| SR-350 | 39.24 | 40.50 | 33.33 | 42.00 | 35.00 |
| HiSil 233 | 25.32 | 34.18 | 22.00 | 25.00 | 22.00 |
| Barytes | 11.39 | — | 33.33 | — | 22.00 |
| Linear Polyethylene | 25.32 | 12.66 | 22.00 | 24.00 | 22.00 |
| $TiO_2$ | 6.33 | 6.33 | 3.34 | 6.00 | 2.00 |
| 2246 | .39 | .4 | .08 | .10 | .10 |
| DiCup 40 | 3.16 | 3.16 | 2.59 | 3.00 | 2.75 |
| D.O.T.G. | .32 | .32 | .33 | — | .40 |
| Blue | .04 | .02 | .17 | — | .02 |
| Red Pigment | — | .02 | — | .02 | .01 |

The highly resilient polybutadiene rubbers as used in the practice of the present invention can be made in any of a number of well known processes or methods, certain ones of which are disclosed in U.S. Pat. No. 3,178,402, while other processes for making this type of a rubber are disclosed, for example, in Belgian Pats. Nos. 551,851; 573,680 and 575,671. These highly resilient polybutadienes are available today commercially from many suppliers. This rubber or elastomer is made from 1,3 butadiene by a solution polymerization process usually using a stereo specific catalyst system. The internal double bonds of the polymer molecules are arranged primarily in the cis configuration and such rubbers usually have some quantities of the trans configuration present therein. Of the particular elastomers found useful in practice of the invention, they are generally referred to herein as cis polybutadiene rubbers or elastomers, and the cis configuration may be present in the polymer molecules of from about 32 to 35 percent of the molecule composition up to approximately 95 to 98 percent or more, depending upon the particular elastomer as being, for example, 95 percent cis configuration in the molecule, this statement means that 95 out of every 100 double bonds in the molecule are of cis configuration. The elastomer remainder is primarily of the trans configuration but small amounts such as up to 2 or 3 percent of 1-2 configuration may be present. Usually in the polymerization, butadiene 1,3 is the starting material, but other dienes may be used as the basic polymerization molecule. It is thought that any conjugated diene of 4 to 5 carbon atoms of which butadiene 1,3 is an example of a 4 carbon diene may be polymerized by the methods referred to hereinbefore to form the rubber or elastomer used in making the golf balls of the invention. The polybutadiene elastomer used must be highly resilient and cis-types of polybutadiene are the elastomers commercially available today with such resilience. Cis-type polybutadiene is used in the specification and claims to refer to such elastomer in which the internal double bonds may be arranged predominantly in the cis configuration but where at least 30 percent of the double bonds are of that configuration.

The high cis content polybutadiene referred to hereinbefore has a cis content in the range of from about 50 or 55 percent to about 90 percent or higher while the low cis content polybutadiene is understood to be in the range of about 32 to about 35 percent cis content but the cis content may vary at least several percent from the figures stated.

While certain patents have been referred to as examples of methods for making highly resilient polybutadiene elastomers for use in practice of the invention, in general, these elastomers are made by polymerization in association with a complex organometallic catalyst with known polymerization techniques to obtain a controlled polymer. Variation in the Zieger-Natta catalyst used varies the resultant cis and/or trans configuration.

As an example, the catalyst $AlEt_2Cl$/Co acetonyl acetonate gives a polymer of 96–98 percent cis content while $Al(Et)_3$/$VCl_4$/$VCl_3$/$VOCl_3$ catalyst will give a 98 percent trans configuration.

In some instances, when practicing the present invention, mixtures of two or more polymers having different percentages or types of cis molecules present therein may be used in formulating the golf ball composition, and it also has been found desirable in some instances to use small quantities, such as from 1 or 2 parts up to about 20 parts but preferably 5 to 15 parts by weight of natural rubber, when used in forming the golf ball composition. Small percentage composition by weight of styrene type resins or elastomers may also be used in the formula used in forming the golf balls of the invention. Such styrene resin is commercially known today and comprises a copolymer of between about 70 to 90 percent of styrene and from about 30 to 10 percent butadiene. Such resins are unsaturated and are vulcanizable. Use of the resin seems to increase the strength and hardness of the finished composition. Also, it improves the click of the ball produced.

In making the new and improved golf ball of the invention, the ball is made primarily from elastomers comprising highly resilient polybutadiene rubber having at least a 30 percent cis configuration, which in the compositions stated herein will be used normally as including such elastomers, or acceptable substitutes therefor, in about 100 parts by weight and the remaining ingredients of the composition and ball produced then can be varied within predetermined limits set of forth in relation to this basic elastomer mass. A methacrylate monomer, as an example of a cross linking agent as so termed in Canadian Pat. No. 732,500, is used between about 25 to 50 parts by weight, and one particularly preferred material for use is trimethylol propane trimethacrylate, referred to hereinbefore as SR-350. However, other compositions that can be satisfactorily used in some instances in substantially the same quantities are ethylene glycol dimethacrylate, polyethylene glycol dimethacrylate, and 1,3 butylene glycol dimethacrylate.

The composition also includes a cross-linking, or curing agent, hereinafter termed a curing or curative agent, in the form of a peroxide, for example, the material DiCup 40C which comprises 40 percent dicumyl peroxide and 60 percent inert material. Such peroxide is used in the range of from about ½ to 10 parts by weight for better results. With increased amounts of the peroxide curing agent, higher compression and hardnesses are obtained in the golf ball. Other organic peroxides or peroxys that may be used in practice of the invention for the dicumyl peroxide would be 2,4 dichlorobenzoyl peroxide (50 percent mix with 50 percent inert filler), 2,5 dimethyl-2-5-di (t-butyl-peroxy) hexane 45 percent mix with 55 percent inert filler, 2,5 dimethyl-2,5 -di (t-butyl-peroxy) hexane 3 (43 percent strength with 57 percent inert filler), or 90 percent strength with 10 percent inert filler, and 2,5-bis (tert-butylperoxy)-2,5 dimethyl hexane.

In the present invention, the most important ingredient in the golf ball and in the composition for forming the golf ball comprises an ultra high molecular weight linear polyethylene. Such material has a molecular weight of between 1.5 to 2.0 million and has a melt index of 0. While this polyethylene can be used in the composition from about 2 to about 40 parts by weight, a preferred range of use of the material is from about 10 to about 25 parts. Preferably this polyethylene is used in the composition in a very small particle size. The particles of such material can be anything from particles adapted to pass through a No. 40 screen (0.165 inch mesh opening), which is also called U.S. standard screen size No. 325, or even finer particles which will pass through a U.S. screen size No. 400, depending upon how fine you desire to use this material in composition and the particle size commercially available. Normally, the polyethylene has been ground to at least a size small enough so as to pass, 100 percent, through the No. 40 screen. This material is available in commercial form and is produced under U.S. Pats. such as Nos. 3,072,633 and 3,050,514. It is believed that this polyethlene material, in the curing of the golf ball, aids in the cross-linking action between the various elastomer molecules and also provides a binding action to help secure the components of the ball together, as described, for example, on Page 28 of the Chemical Engineering News of Apr. 25 1966, and an article entitled "Acrylic Graft Makes Polyethylene Bondable" in the Mar. 14, 1966 issue of the same magazine.

By use of the ultra high molecular weight polyethylene of the invention, such material acts not as a reenforcing ingredient, i.e. a physical change in the golf ball composition, but such polyethylene effects a chemical change, or cross-linking of the various ingredients in the golf ball forming composition during the vulcanization action. This improved chemical characteristic and/or cross-linking of the resultant molecules in the golf ball material provides improved strength, toughness, and impact resistance whereby the service life of the golf ball is improved. Thus, the durability of the golf ball is improved and at least a 10 to 100 percent reduction in the percentage of broken balls is obtained by use of the golf ball of the invention in relation to similar golf balls not having the novel polyethylene material of the invention present therein, when comparing the golf balls over equivalent periods of test and/or use life.

A finely divided reenforcing pigment or material, in this instance, preferably a fine particle size white silica filler, such as HiSil 233 is used in the ball, and it preferably is present in the composition between about 10 to 40 parts by weight. With increasing amounts of the HiSil 233 being used in the range stated, it provides higher compression and hardness in the resultant golf ball but lowers the rebound characteristics of the ball. HiSil 233 is a precipitated hydrated silica of very fine ultimate particle size and it comprises about 89.2 percent of silicon dioxide and small amounts of other materials. It has a particle size of approximately 0.022 microns.

Suitable fillers include Dixie Clay which is an inert hard kaolin clay and barytes. Silene EF is another suitable silica type reenforcing material and it is a hydrated silicate comprising about 65 percent silica, about 19.5 percent lime, small amounts of other oxides and salt, and the remainder water of hydration. The fillers and reenforcing materials may be used individually, or two or more materials may be used within the ranges stated. Normally these reenforcing materials used are all conventional and aid in weight control and strength of bond of the ultimate vulcanized composition. Normally, the smaller the particle size the more difficult the material is to disperse into the batch and the more effective the material is for a given total weight.

In the golf ball forming composition of the invention, generally speaking, it is desired to use a total of between about 30 to about 60 total parts of white, or non-black fillers and/or reenforcing materials. Thus, normally, white silica reenforcing material is used in the golf ball composition, whereas filler pigments such as barytes, Dixie Clay, or equivalent material, can also be present in the composition from about 10 to 40 parts per hundred parts of elastomer, depending upon the actual properties desired in the resultant ball, and the weight requirements thereof, which filler pigments are a part of the fillers and/or reenforcing materials present. Such filler materials particularly are useful in controlling the weight of the resultant product and do not normally add strength to the composition, which strength is provided by the reenforcing pigments or materials and other binder materials in the novel composition of the invention.

As it is normal to provide a golf ball of white color, a suitable white pigment, such as titanium dioxide, is usually present in the composition in about between 4 to 10 parts by weight. One good method for adjusting the weight of the molded product is to vary the amount of titanium dioxide used. Some size variations in vulcanized balls may be compensated for by the painting or finishing of the balls.

Minor quantities of pigments, anti-oxidants and additional curing ingredients, such as accelerators, are also present in the composition and they may include the substance listed hereinabove as 2246, which comprises primarily 4 methyl, 6 tertiary butyl phenol; the di-ortho-tolyguanidine, listed hereinabove as D.O.T.G.; and a blue pigment, such as ultramarine, between about 0.02 to 0.2 parts by weight. The totals for these whiteners, pigments, and accelerators in the composition usually will not exceed 10 parts and it primarily will comprise the whitener material.

The polybutadiene rubbers used have good low temperature flexibility, high resistance to abrasion, and high resilience. 1-X crepe is the designation for natural rubber used in practice of the invention and when used preferably is present in the range of from about 5 to about 15 parts by weight of 100 parts total rubbers present. The natural rubber may be present, as an upper limit, to about 20 parts by weight. Natural rubber serves as a binder and facilitates processing the mix. Other natural rubbers and synthetic rubbers may be used in the compositions for the 1-X crepe in the ranges stated.

When increased amounts of the acrylates are used, the resultant golf ball produced tends to have improved compression and hardness but variation in the amount of such material used within the range states does appear to change the rebound characteristics of the ball obtained.

Golf balls produced from the formulas of the invention have had a compression of between about 60 to 75 under the standard United States Golf Association test, and had a durometer of about 85 on the Shore A scale, had a rebound of about 73 inches out of a 100 inch drop, and had a "click" that was very good and comparable to that of relatively expensive, or costly quality golf balls in use today and made from a separate center, winding, and cover.

In some instances, it is possible to use the golf ball of the invention without applying any coating or painting thereto, but preferably any suitable paint may be applied to the ball, and be dried thereon, after the ball has been molded. The various ingredients of the elastomer composition of the invention can be mixed in conventional manners, and then be extruded through known equipment into a strip form after which sections of the strip can be severed in the desired quantities and be individually placed in suitable compression molds for production of the finished molded products. The actual compositions, as set forth hereinabove, have been satisfactorily cured in the range of about 18 minutes at 320°F.

The golf ball of the invention has had a rebound characteristic that is very comparable to that of high quality balls, and this test usually is performed by dropping the ball onto a hard rebound surface, such as a marble plate or block, and the golf ball when used or tested has a very satisfactory sound pleasing to the ear of the golfer accustomed to high quality golf balls as made and sold today.

The rebound characteristics of a golf ball are believed to be improved appreciably when the acrylic resins disclosed have been used in combination with the dicumyl peroxide, or its equivalent. It is believed that the combination of the highly resilient polybutadiene rubber and the linear polyethylene as described herein with the cross linking agent, peroxide, and silica in a golf ball composition provides a novel and improved ball by cooperative action of all such ingredients. While some variation in the ingredients and compositions stated hereinbefore are possible, the preferred compositions are set forth hereinabove and have given the best results in tests of golf balls produced from the new compositions of the invention.

From the foregoing, it is believed that it will be seen that the objects of the invention have been achieved.

While a complete embodiment, or example of the invention has been disclosed herein, it will be appreciated that modification of this particular embodiment of the invention may be resorted to without departing from the scope of the invention as defined in the appended claims.

What is claimed is:

1. A golf ball comprising a unitary, solid, cured elastomer made by vulcanization of the composition consisting essentially of the following ingredients in the ratios stated:
   highly resilient polybutadiene elastomer materials having at least 30 percent cis configuration about 80 to 100 parts.
   about 25 to 50 parts of a material from the class consisting of 1,3 butylene glycol dimethacrylate, ethylene glycol dimethacrylate, polyethylene glycol dimethacrylate, and trimethylol propane trimethacrylate,
   high density and molecular weight linear polyethylene having a molecular weight of between 1.5 and 2 million and a melt index of 0 in small particle size from about 2 to about 40 parts,
   a peroxide curing agent about 0.5 to 10 parts, and
   finely divided reenforcing and filler materials about 30 to 60 parts.

2. A golf ball as in claim 1 where 2 to 12 parts of a butadienestyrene resin are present in the initial composition, which resin is made from about 70 to 90 percent styrene and about 30 to 10 percent butadiene by weight.

3. A golf ball as in claim 1 where about 25 parts of the high density polyethylene are present in the initial composition.

4. A golf ball as in claim 1 wherein the initial composition includes up to 10 parts of whitener, accelerator and pigment materials.

5. A golf ball as in claim 1 where the initial composition includes from about 10 to about 40 parts of hydrated silica and from about 10 to about 40 parts of barytes as said reenforcing and filler materials.

6. A golf ball as in claim 1 where the initial composition has natural rubber therein between about 2 to about 20 parts.

7. A golf ball comprising a unitary, solid, cured elastomer made by vulcanization of the composition consisting essentially of the following ingredients:
   highly resilient polybutadiene elastomer material about 100 parts,
   about 20 to 50 parts of a material from the class consisting of 1, 3 butylene glycol dimethacrylate, ethylene glycol dimethacrylate, polyethylene glycol dimethacrylate and trimethylol propane trimethacrylate,
   high density and molecular weight linear polyethylene that has a molecular weight of between 1.5 and 2.0 million in small particle size from about 2 up to about 40 parts,
   a peroxide curing agent about 0.5 to 10 parts, and
   finely divided reenforcing and filler materials about 30 to 60 parts.

8. A golf ball as in claim 7 wherein the initial composition includes from about 10 to about 25 parts polyethylene.

9. A golf ball as in claim 7 where the curing agent is selected from the class consisting of dicumyl peroxide, 2, 4 dichlorobenzoyl peroxide, 2, 5 dimethyl-2-5-di (t-butyl-peroxy) hexane, and 2, 5 dimethyl-2-5-di (t-butyl-peroxy) hexane. 3.

10. A golf ball as in claim 7 where the linear polyethylene has a particle size to pass through a 0.0165 inch screen opening, and a melt index of 0.

11. A golf ball as in claim 1 where the linear polyethylene has a particle size to pass through a 0.0165 inch screen opening.

12. A golf ball as in claim 1 where the curing agent is selected from the class consisting of dicumyl peroxide, 2, 4 dichlorobenzoyl peroxide, 2, 5 dimethyl-2-5-di (t-butyl-peroxy) hexane, and 2, 5 dimethyl-2-5-di (t-butyl-peroxy) hexane 3.

13. A golf ball as in claim 9 where the linear polythylene has a molecular weight of between 1.5 and 2.0 million, a particle size to pass through a 0.0165 inch screen opening, and has a melt index of 0.

14. A golf ball as in claim 8 where the curing agent is selected from the class consisting of dicumyl peroxide, 2,4 dichlorobenzoyl peroxide, 2, 5 dimethyl-2-5-di (t-butyl-peroxy) hexane, and 2, 5 dimethyl-2-5-di (t-butyl-peroxy) hexane 3.

15. A gold ball as in claim 14 where the linear polythylene has a molecular weight of between 1.5 and 2.0 million, a particle size to pass through a 0.0165 inch screen opening, and has a melt index of 0.

16. A molded ball having the gravity and click and rebound of a golf ball and the size of a golf ball which includes elastomeric vulcanizate prepared from a composition consisting essentially of diolefin rubber having at least 30 percent cis configuration, a cross-linking agent, a curing agent, finely divided reinforcing and filler materials and as an impact modifier, finely divided polyethylene dispersed in the vulcanizate, which polyethylene has a molecular weight of 1,500,000 to 2,000,000 and is present as a separate phase in the vulcanizate.

17. A molded ball as in claim 16 where from about 80 to 100 parts of the diolefin rubber, about 20 to 50 parts of a cross-linking agent, about 2 to 40 parts of the polyethylene, and about 0.5 to 10 parts of a peroxide curing agent are present in the composition from which the ball is made.

18. A molded ball having the gravity and click and rebound of a golf ball and the size of a golf ball which includes elastomeric vulcanizate prepared from a composition consisting essentially of diolefin rubber having at least 30 percent cis configuration, a cross-linking agent, a curing agent, finely divided reinforcing and filler materials and a finely divided polyethylene dispersed in the vulcanizate, which polyethylene has a molecular weight of between 1,500,000 and 2,000,000, a particle size to pass through a 0.0165 inch screen opening, and a melt index of 0.

19. A molded ball as in claim 18 where from about 20 to 50 parts of a cross linking agent are present.

20. A molded ball as in claim 18 where from about 2 to about 40 parts of the polyethylene are present.

21. A molded ball as in claim 18 where from about 80 to 100 parts of the diolefin rubber, about 20 to 50 parts of a cross linking agent, about 2 to 40 parts of the polyethylene, about 30 to 60 parts of reenforcing and filler materials, and about 0.5 to 10 parts of a peroxide curing agent are present in the composition from which the ball is made.

22. A molded ball having the gravity and click and rebound of a golf ball formed of an elastomeric vulcanizate prepared from a composition consisting essentially of diolefin rubber having at least 30 percent cis configuration, a cross-linking agent, a curing agent, finely divided reinforcing and filler materials and finely divided polyethylene dispersed in the vulcanizate, said polyethylene being an ultra-high molecular weight polyethylene having an average molecular weight of at least 1,500,000.

* * * * *